(12) United States Patent
Bennett et al.

(10) Patent No.: US 6,484,600 B1
(45) Date of Patent: Nov. 26, 2002

(54) PNEUMATIC THREE-POSITION SHIFT MECHANISM WITH FEWER COMPONENTS

(75) Inventors: John L. Bennett, Fraser, MI (US); Herbert A. Larsen, Clarkston, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/851,711

(22) Filed: May 9, 2001

(51) Int. Cl.[7] .......................... F16H 59/02; F16D 25/08
(52) U.S. Cl. ................... 74/473.11; 192/87.14
(58) Field of Search .............................. 74/346, 473.11; 92/13.1, 13.4, 62, 65; 192/87.14

(56) References Cited

U.S. PATENT DOCUMENTS

| | | | | |
|---|---|---|---|---|
| 4,920,813 A | * | 5/1990 | Willford | 74/11 |
| 5,012,725 A | * | 5/1991 | Leary | 74/335 |
| 5,067,323 A | * | 11/1991 | Bennett et al. | 60/39.27 |
| 5,125,326 A | * | 6/1992 | Sarcona | 74/364 |
| 6,202,812 B1 | * | 3/2001 | Semke | 192/48.91 |

\* cited by examiner

*Primary Examiner*—David A. Bucci
*Assistant Examiner*—Colby Hansen
(74) *Attorney, Agent, or Firm*—Carlson, Gaskey & Olds

(57) ABSTRACT

An improved transfer case has fewer parts than the prior art to achieve the pneumatic three-position function. In the prior art the pneumatic cylinders were provided by bolt-on housings which required additional components to achieve a fluid tight connection. The present invention incorporates its fluid cylinders within bores formed into the transfer case housings. In this way, the required number of housing components is greatly reduced compared to the prior art.

11 Claims, 4 Drawing Sheets

US 6,484,600 B1

PNEUMATIC THREE-POSITION SHIFT MECHANISM WITH FEWER COMPONENTS

BACKGROUND OF THE INVENTION

This invention relates to a pneumatic three-position shift mechanism for use in vehicle transfer cases wherein the number of components to provide the shift mechanism is reduced compared to the prior art.

Vehicle transfer cases are typically provided with the ability to move a shift yoke between a first position at which is engages a low speed gear, a second position at which it engages a high speed gear, and a third intermediate neutral position at which neither gear is engaged. Typically, these systems have incorporated a shift rod that is movable within a two-part housing between the three positions. At one end of the shift rod are a pair of cylinders movable within three different chambers and between the several positions. At the opposed end of the shift rod is a guiding chamber in which the shift rod is movable.

In the prior art, all of the fluid chambers are provided by separate housings which are bolted to the main transfer case housings. With each separate housing, the number of seals and fluid tight connections that must be utilized increases. Thus, with the prior art, there are required seals and securing devices for separate fluid housings at each of the two ends of the transfer case.

FIG. 1 shows an example 20 of the prior art transfer case. A housing 22 has a split line 24 dividing two housings sub-portions 26 and 28. A shift rod 30 is received extending between the two, and moves a shift collar 32 to selectively engage one of the two gears 34 and 36. Gear 34 is a low speed and gear 36 is a high speed gear. The collar 32 is shown in the intermediate or neutral position.

A fluid cylinder 38 is bolted to one end of the housing 28. The other housing portion 26 receives the bolted on fluid housing 40. Housing 40 receives the rear end 42 of the shift rod 30 and housing 38 receives the forward end 44 which moves with a plurality of pistons to achieve the various positions of the collar 32.

As can be appreciated, with the separate housings 38 and 40 a good deal of additional attachments, seals, etc. are necessary.

SUMMARY OF THE INVENTION

In the disclosed embodiment of this invention, the chambers for receiving both the piston and preferably the remote end of the shift rod are formed by integral bores in the transfer case housings. In this way, the bores are self-sealed, and no separate sealing elements or elaborate fluid-type securing devices are necessary.

In a preferred embodiment of this invention, both of the chambers are formed by bores. The bore for receiving a remote end is preferably a blind bore extending into the housing. The bore for receiving the piston end of the shift rod is preferably a bore which opens outwardly through a plurality of stepped bore portions. One of the pistons is preferably of a larger diameter and is movable within a first stepped portion. An end cap is received with a second outer diameter stepped portion of the bore, and provides the outer end for the fluid cylinder. This cap is all that need be secured to the housing in a fluid tight manner. As can be appreciated, the present invention thus greatly reduces the number of required components.

These and other features of the present invention can be best understood from the following specification and drawings, the following of which is a brief description.

DETAILED DESCRIPTION OF THE PREFERRED EMBODIMENT

Figure 1:
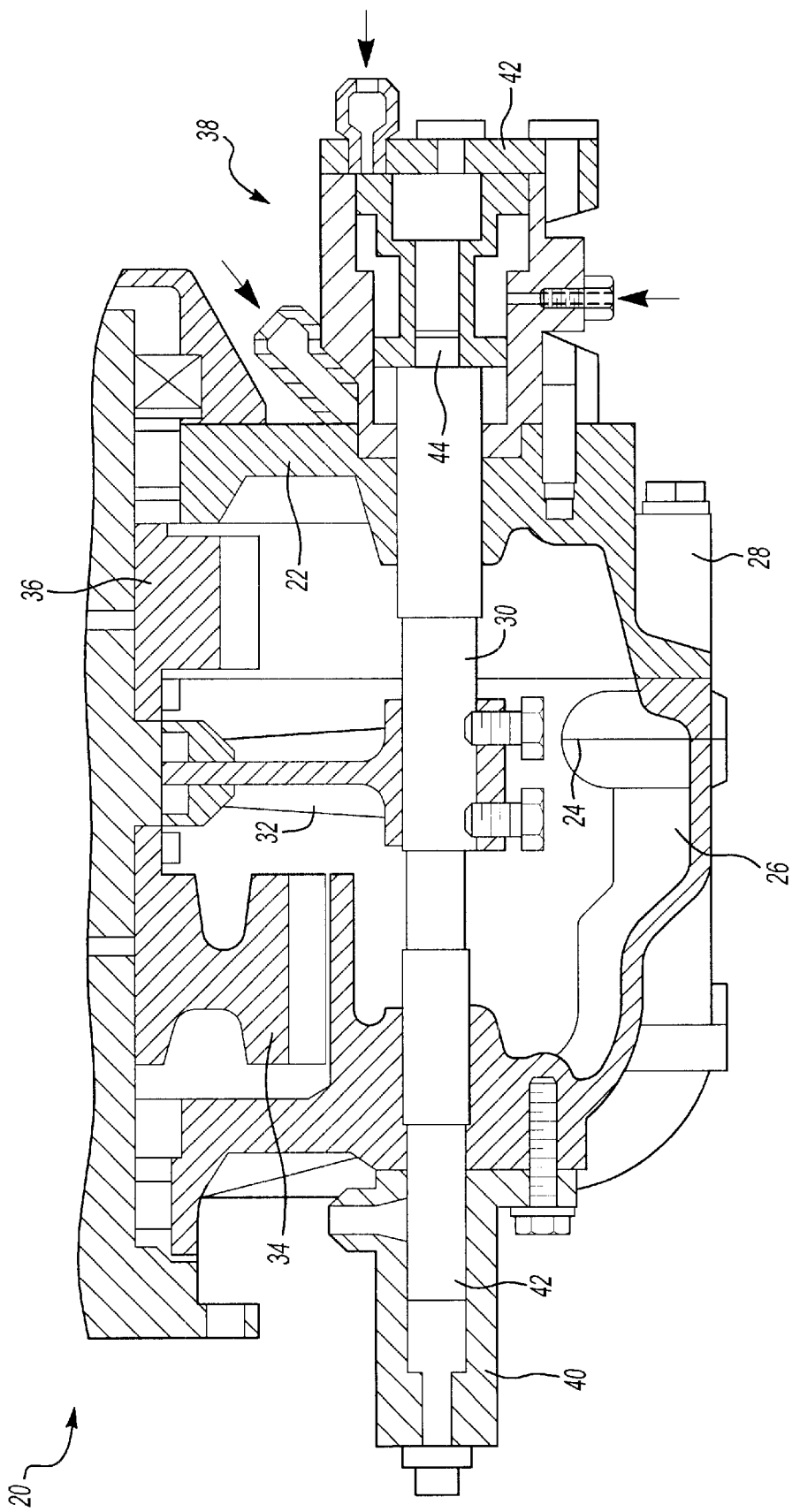
FIG. 1 shows the prior art.
Figure 2:
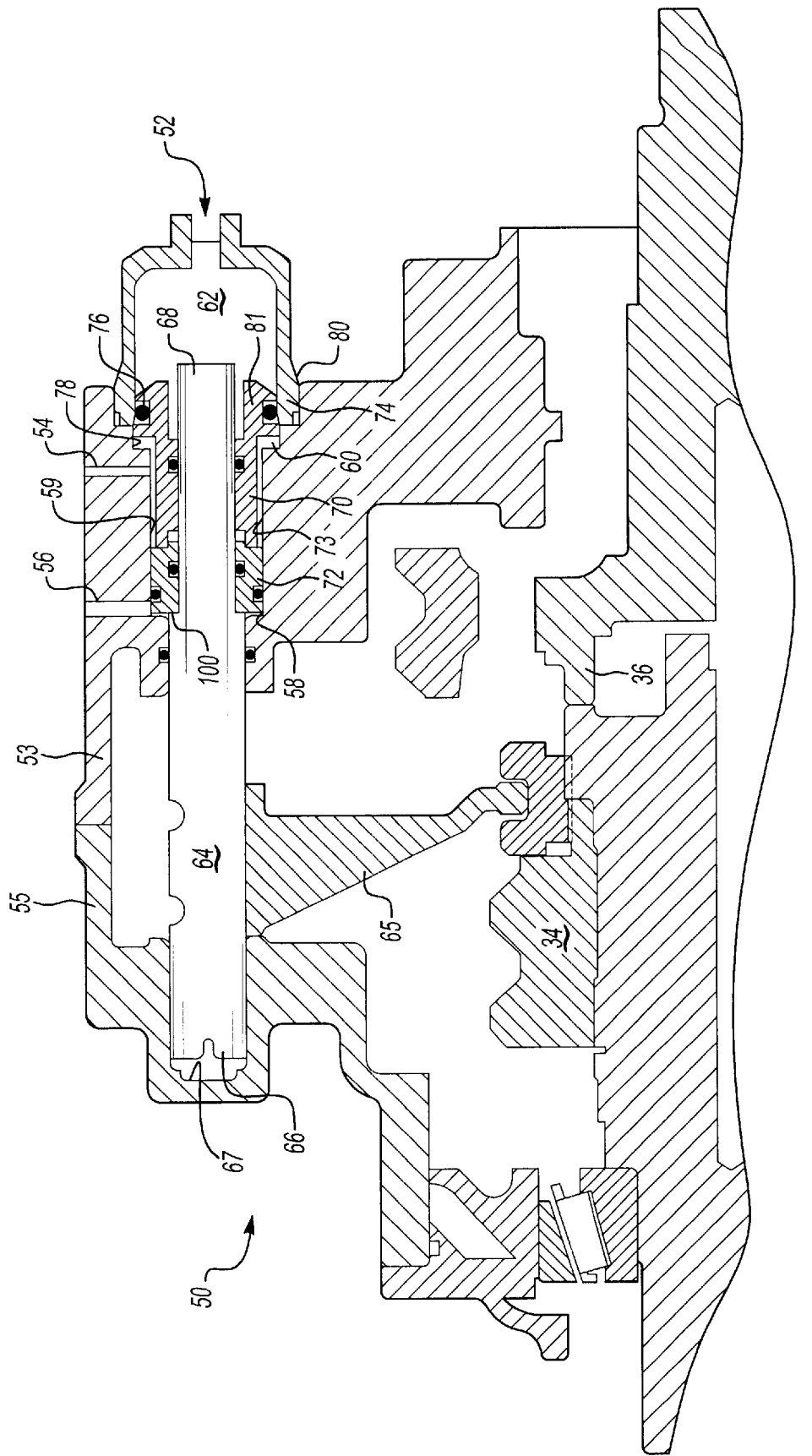
FIG. 2 shows the inventive transfer case in a low speed position.

An inventive transfer case 50 is illustrated in FIG. 2 having a first fluid connection 52 for supplying a first pressurized fluid, preferably air, a second fluid connection 54 and a third fluid connection 56. Third connection 56 supplies pressurized air selectively to a chamber 58, connection 54 supplies pressure to a chamber 60 and supply 52 selectively supplies pressurized air to a chamber 62. The attachment of the air to each of the three inputs 52, 54, and 56 selectively drive the shift rod 64 in a manner that is not distinct from that of the prior art. A remote end 66 of the shift rod 64 moves within a blind bore 67 within housing element 55. The other end 68 of the shift rod 64 selectively moves with a pair of pistons 70 and 72 between the various positions as will be clear between FIGS. 2–4. The bore 73 for receiving the piston is formed as an integral bore within the housing component 53. An end cap 74 closes off the bore 73, and carries the fluid connection 52. Seals 76 are positioned between the piston 72 and 70 and the cap 74, and housing 53 as appropriate.

As can be seen, the piston 70 has an enlarged radially outer portion 81 which is received within a portion 78 of the bore 73. A second enlarged portion 80 of the bore 73 receives the outer periphery of the end cap 74.

The use of the bores 72 in the housing 53 and the bore 67 in the housing 55 eliminates the required separate housings of the prior art, and greatly minimizes the components necessary to provide the shift mechanism. FIG. 2 shows the collar 65 in a position such that the low speed gear 34 is engaged.

Figure 3:
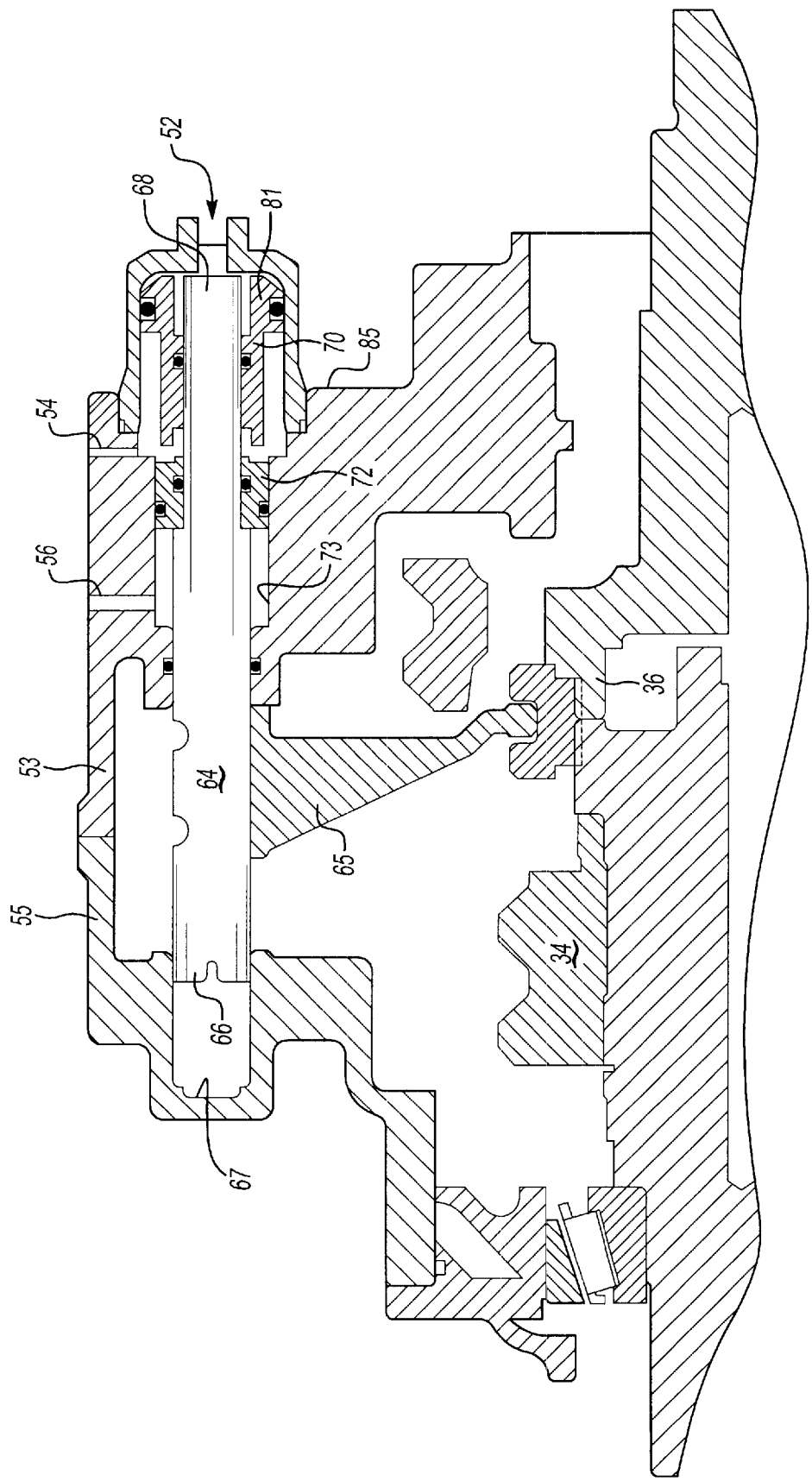
FIG. 3 shows the inventive transfer case in a high speed position.

FIG. 3 shows the pistons 72 and 70 shifted to the right from the position shown in FIG. 2, and the shift collar 65 is now engaged on the high speed gear 36. As can be appreciated, the entirety of movement of the piston 72 is within the bore 73 between these two extreme positions. Moreover, as can be appreciated between the FIG. 2 and FIG. 3 position, while the enlarged portion 81 of the piston 72 has now moved outwardly beyond a forward end 85 of the bore, in the FIG. 2 position the enlarged piston 70 is within the bore, and to the left and forward of 85.

Figure 4:
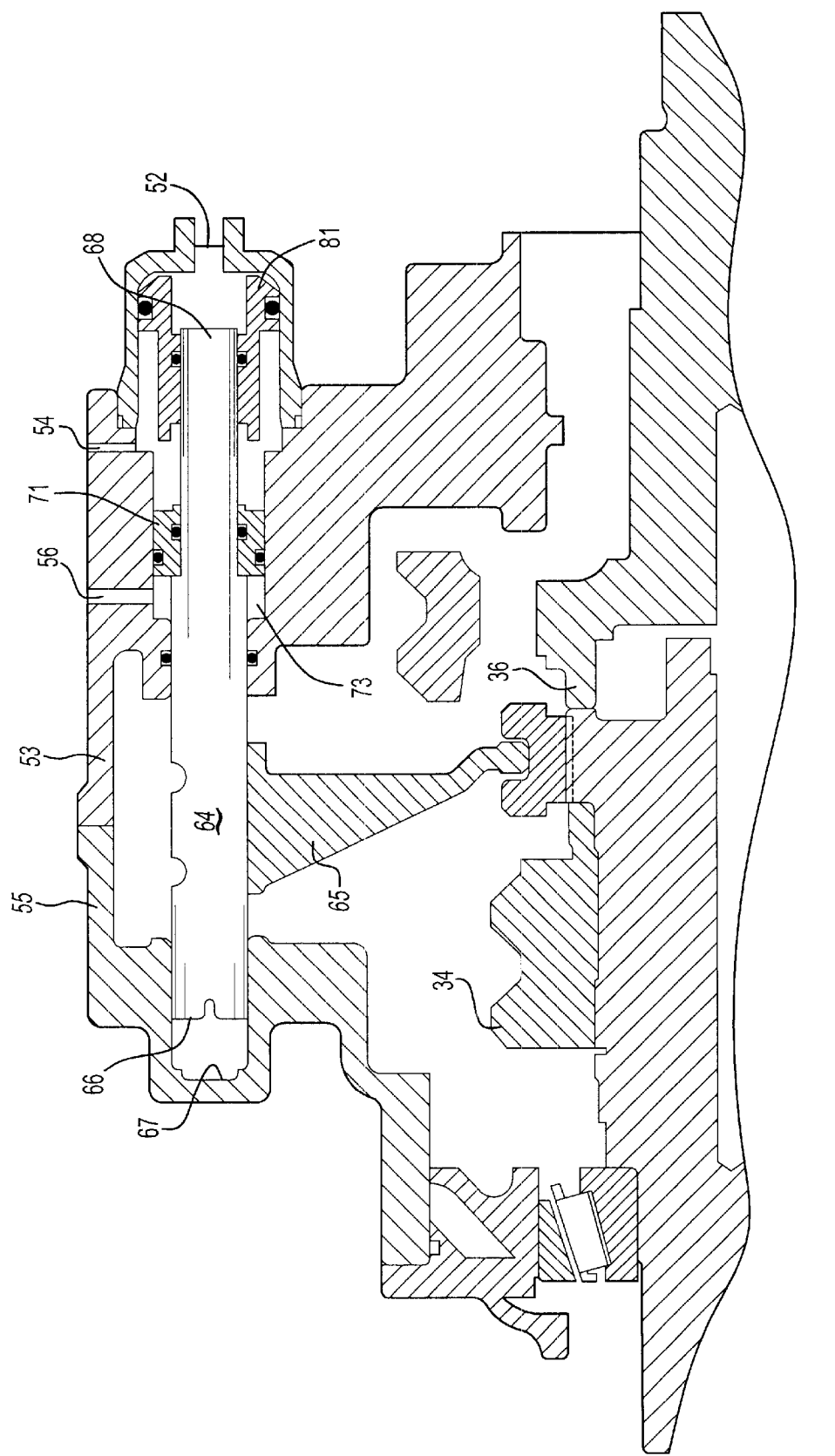
FIG. 4 shows the inventive transfer case in a neutral position.

FIG. 4 shows the neutral position at which the shift collar 65 is at an intermediate position. As can be appreciated, the smaller piston 72 is still fully within the bore 83. The enlarged portion 81 of the piston 70 is still forward of the end 85.

As can be appreciated, by selectively controlling the flow of pressurized fluid to the supply taps 52, 54 and 56 the pistons can be moved to the various positions and the resulting movement of the shift rod 64 and collar 65 can be achieved. As can be appreciated, the piston 70 can slide relative to the shift rod 64. Thus, when the rod is being driven to the high gear position such as shown in FIG. 3, pressurized fluid is delivered to taps 54 and 56, but not to tap 52. This causes the piston 70 to move to the right along the shift rod to the position such as shown in FIG. 3. When moving the shift rod to the neutral position shown in FIG. 4, fluid is delivered generally to the tap 54, but not the taps 52 and 56. This drives the piston 72 to the left and to the FIG. 4 position. Finally, when moving back to the FIG. 2 position, pressurized fluid is delivered to tap 52, but not taps 54 and 56. The piston 70 initially moves to the left along the shift rod 64, but once it abuts the piston 72, the entirety of the shift rod 64 and the pistons 72 and 70 move to the left since the piston 70 will abut the piston 72, which in turn abuts a collar 100 on the shift rod 64.

Although a preferred embodiments of this invention have been disclosed, a worker in this art would recognize that certain modifications would come within the scope of this invention. For that reason the following claims should be studied to determine the true scope and content of this invention.

What is claimed is:

1. A vehicle transfer case comprising:
   a shift collar movable with a shift rod between three positions, with said shift collar selectively engaging a low speed gear and a high speed gear in two positions and being in a neutral position in a third position;
   a housing for housing said shift rod, and said high speed and low speed gear, said housing comprising two housing halves; and
   a fluid shift mechanism for driving said shift rod between three positions corresponding to said low speed, said high speed and said neutral position, said shift rod being driven by pistons at a first end of said shift rod, and moving with said shift rod within fluid chambers, and there being pressurized fluid supplies for selectively directing pressurized fluid to said chambers, and at least a portion of said chambers being formed by an open bore within a first of said housing halves.

2. A transfer case as recited in claim 1, wherein a second end of said shift rod remote from said first end of said shift rod moves within a blind bore formed integrally within a second of said housings.

3. A transfer case as recited in claim 1, wherein there are a pair of said pistons movable with said shift rod, with one of said pistons being movable relative to said shift rod in one direction, but moving with said shift rod when said other of said pistons moves in said second direction, and one of said pistons being fixed to move with said shift rod.

4. A transfer case as recited in claim 3, wherein said second piston which is fixed to move with said shift rod moving only within said open bore in said first housing.

5. A transfer case as recited in claim 4, wherein said open bore extends to an open end, and an end cap being secured within said open end.

6. A transfer case as recited in claim 4, wherein said second piston moves within said end cap, but is within an axial extent of said open bore in said first housing for at least a portion of movement to achieve one of said three positions.

7. A transfer case as recited in claim 4, wherein said bore has three inner diameters, with the first inner diameter receiving said second piston and a portion of said first piston, an enlarged portion of said first piston moving within a second outer diameter bore, and said end cap being received within said third outer diameter bore portion.

8. A vehicle transfer case comprising:
   a shift collar movable with a shift rod between three positions, with said shift collar selectively engaging a low speed gear and a high speed gear in two positions and being in a neutral position in a third position;
   a housing for housing said shift rod, and said high speed and low speed gear, said housing comprising two housing halves; and
   a fluid shift mechanism for driving said shift rod between three positions corresponding to said low speed, said high speed and said neutral position, said shift rod being driven by pistons to a first end of said shift rod, and moving with said shift rod within fluid chambers, and there being pressurized fluid supplies for selectively directing pressurized fluid to said chambers, and at least a portion of said chambers being formed by an open bore within a first of said housing halves, a blind bore within a second of said housing halves receiving a second end of said shift rod, with a pair of pistons movable with said shift rod, one of said pistons being movable relative to said shift rod in one direction, and a second of said pistons being fixed to move with said shift rod, said second of said pistons moving only within said open bore in said housing between said three positions.

9. A transfer case as recited in claim 8, wherein said open bore extends to an open end, and an end cap being secured within said open end.

10. A transfer case as recited in claim 8, wherein said second piston moves within said end cap, but is within an axial extent of said open bore in said first housing for at least a portion of movement to achieve one of said three positions.

11. A transfer case as recited in claim 8, wherein said bore has three inner diameters, with the first inner diameter receiving said second piston and a portion of said first piston, an enlarged portion of said first piston moving within a second outer diameter bore, and said end cap being received within said third outer diameter bore portion.

* * * * *